US012652747B2

(12) United States Patent
Pascoguin et al.

(10) Patent No.: US 12,652,747 B2
(45) Date of Patent: Jun. 9, 2026

(54) WIRELESS TRANSMISSION BY INDUCED PLASMA

(71) Applicant: The United States of America, as represented by the Secretary of the Navy, San Diego, CA (US)

(72) Inventors: Bienvenido Melvin L Pascoguin, San Diego, CA (US); Brittany Lynn, Spring Valley, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 99 days.

(21) Appl. No.: 18/791,688

(22) Filed: Aug. 1, 2024

(65) Prior Publication Data

US 2025/0311082 A1 Oct. 2, 2025

Related U.S. Application Data

(60) Provisional application No. 63/571,843, filed on Mar. 29, 2024.

(51) Int. Cl.
*H05H 1/46* (2006.01)

(52) U.S. Cl.
CPC .................................. *H05H 1/4645* (2021.05)

(58) Field of Classification Search
None
See application file for complete search history.

(56) References Cited

U.S. PATENT DOCUMENTS

| | | | | |
|---|---|---|---|---|
| 10,069,564 | B2 | 9/2018 | Hening et al. | |
| 11,621,721 | B1 * | 4/2023 | Hagerty | H03M 1/462 341/172 |
| 2003/0142021 | A1 * | 7/2003 | Anderson | H01Q 1/366 343/701 |
| 2020/0176856 | A1 | 6/2020 | Hening et al. | |
| 2020/0373951 | A1 * | 11/2020 | Broyde | H04B 1/0458 |
| 2024/0072422 | A1 | 2/2024 | Muhleman et al. | |

* cited by examiner

*Primary Examiner* — Kenneth B Wells
(74) *Attorney, Agent, or Firm* — Naval Information Warfare Center, Pacific; Kyle Eppele; Andrew J. Cameron

(57) ABSTRACT

A wireless transmission method includes determining a target radio frequency, selecting a target energy density, and directing a source of high-energy to a focal location. The target energy density is selected based on the target radio frequency and corresponds to an energy density of an area of plasma that is to be generated. The source of high-energy is then directed to the focal location to generate the area of plasma at or near a remote device, where the area of plasma includes a radio frequency component that is at the target radio frequency.

19 Claims, 11 Drawing Sheets

WIRELESS TRANSMISSION BY INDUCED PLASMA

REFERENCE TO RELATED APPLICATIONS

This application claims priority to U.S. Provisional Application No. 63/571,843 filed Mar. 29, 2024, which is hereby incorporated by reference.

FEDERALLY-SPONSORED RESEARCH AND DEVELOPMENT

The United States Government has ownership rights in one or more inventions provided in this disclosure. Licensing inquiries may be directed to Office of Research and Technical Applications, Naval Information Warfare Center Pacific, Code 72110, San Diego, CA, 92152; (619) 553-5118; ssc_pac_t2@navy.mil. Reference Navy Case No. 211438.

TECHNICAL FIELD

Aspects of the present disclosure relate generally to wireless communications, and in particular but not exclusively, relate to wireless transmissions by way of induced plasma.

BACKGROUND OF THE INVENTION

Wireless communications are ubiquitous and wireless communication systems are widely deployed to transmit various types of content, such as data, voice, multimedia, and so on. In general, wireless communication refers to the transfer of information between two or more devices without the use of an electrical conductor, optical fiber, or other continuous-guided medium for bridging the transfer between them. For example, a cellular telephone, a two-way radio, a wireless access point, a Bluetooth receiver, a GPS receiver, etc., may each utilize an air interface for receiving and/or sending radio frequency (RF) waves from/to another device. Efforts continue in the development of wireless communications with some stated goals of increased security, reliability, and/or for providing designers with additional flexibility in adapting particular systems best suited for their intended domains.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
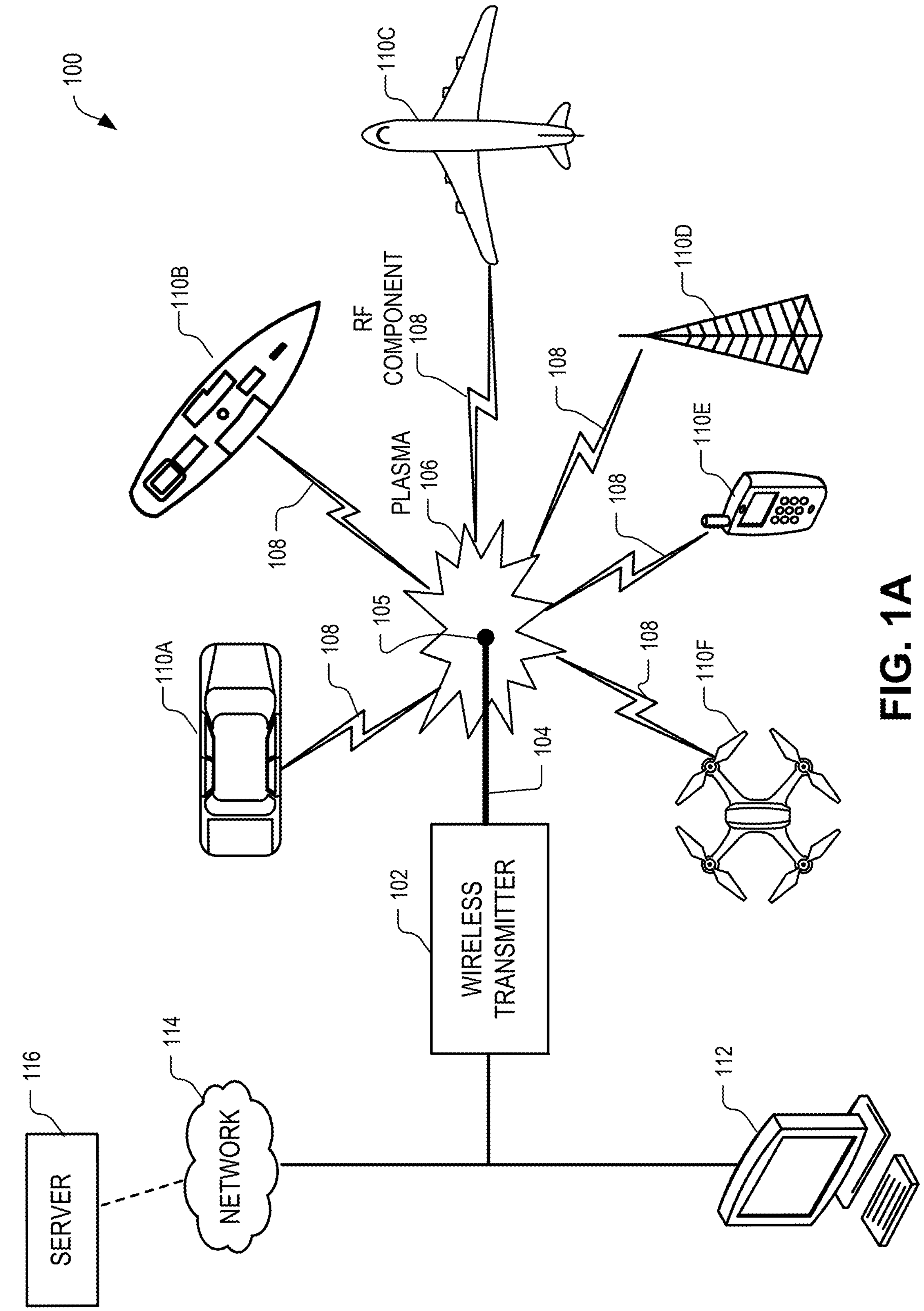
FIG. 1A illustrates an example wireless communication system, in accordance with aspects of the disclosure.

Embodiments of a method, a wireless transmitter, a remote device, and wireless communication system for wireless transmission through induced plasma are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As mentioned above, efforts continue in the development of wireless communications. While some existing communication systems rely exclusively on the use of radio frequency (RF) waves, aspects of the present disclosure may utilize additional electromagnetic phenomena, referred to herein as remotely-generated or induced plasma. As will be described below, aspects of the present disclosure may include a wireless transmitter that is configured to direct a source of high-energy (e.g., one or more lasers) to a focal location to generate an area of plasma at or near a remote device. The remotely-generated area of plasma may include (i.e., emit) an RF component that may then be received by the remote device. In some examples, the RF component is a dominant frequency of RF components produced by the area of plasma.

Accordingly, the present disclosure provides a method and wireless transmitter for generating and controlling one or more aspects of an area of induced plasma to produce an RF component that is the same as or similar to a target radio frequency. In some instances, the RF component generated by the plasma is dependent on the energy density of the area of plasma. Thus, in some aspects, the wireless transmitter, as provided herein, is configured to adjust the energy density of the area of plasma in order to control the RF component produced by the plasma. The energy density of the area of plasma can be controlled by the wireless transmitter in a variety of ways, such as by adjusting a focal location, a size, or a shape of the area of plasma. Additional methods of controlling the energy density may include adjusting a power level of the high-energy source used to generate the plasma. In yet another example, the high-energy source used to generate the plasma may include one or more lasers, where adjusting the energy density of the plasma includes adjusting the number of lasers utilized to generate the plasma.

In some aspects, the methods and wireless transmitters discussed herein may include transmitting data by way of controlling the RF component generated by the induced plasma. For instance, in some aspects, a frequency shift-keying (FSK) scheme may be utilized to determine a series of target frequencies. The wireless transmitter may then dynamically adjust the energy densities of an induced area of plasma to sequentially generate RF components at the target frequencies, where the remote device then receives the RF components and decodes the detected frequencies to receive the data. These and other aspects of the present disclosure will be described further detail below.

FIG. 1A illustrates an example wireless communication system 100, in accordance with aspects of the disclosure. As shown in FIG. 1A, example wireless communication system 100 includes a wireless transmitter 102 and example remote devices 110A-110F. Wireless communication system 100 is also shown as including an optional computing device 112, optional network 114, and optional server 116. Also shown in FIG. 1A is an output 104 of a source of high-energy, an area of plasma 106, and an RF component 108. Although FIG. 1A illustrates example remote devices 110A-110F as including a vehicle 110A, a ship 110B, an aircraft 110C, an antenna 110D, a user device 110E, and an unmanned aerial vehicle 110F, any remote device that is configured to receive and/or detect one or more RF frequencies may be utilized in wireless communication system 100.

Wireless transmitter 102 of FIG. 1A is configured to wirelessly communicate with one or more of the remote devices 110A-110F. For example, wireless transmitter 102 may be configured to direct the output 104 of a source of high-energy to a focal location 105 to generate, or induce, the area of plasma 106. In some examples, the focal location 105, and thus, the area of plasma 106 is located at or near one or more of the remote devices 110A-110F. The remotely-generated area of plasma 106 may include, or emit, an RF component 108 that is then wirelessly received by the one or more remote devices 110A-110F. In some examples, the RF component 108 is a dominant frequency of RF emissions produced by the area of plasma 106. A "dominant frequency," as used herein, may also be referred to as a "natural frequency," which may include the resonant frequency of the system. Furthermore, a natural frequency of a system may include the frequency that will give the most amplitude of the output once an external force is applied to control the frequency output of the system.

As an example of the use of the natural or dominant frequency, a signal h(t) emitted from an area of plasma may be represented by h(t), EQ(1).

Equation 1 is the time domain signal of a signal generated by an area of plasma. To analyze the frequency of this signal, apply a Fourier transform on this signal, as follows:

$$H(v) = FourrierTransform\,[h(t)], \qquad \text{EQ (2)}$$

where the function "H" is the frequency content of the signal "h". This means that if a pulse train is generated at some frequency "f", such that at every "t=1/f" time, a signal is generated. A pulse train signal "g" can then be formulated in terms of a signal of an area of plasma as follows:

$$g(t) = h(t-0) + h\left(t - \frac{1}{f}\right) + h\left(t - \frac{2}{f}\right) + \cdots + h\left(t - \frac{n}{f}\right) \qquad \text{EQ (3)}$$

$$g(t) = \sum_n h\left(t - \frac{n}{f}\right)$$

By applying the Fourier transform to "g" to get the function "G", then the following results:

$$G(v) = FourierTransform\,(g(t)) \qquad \text{EQ (4)}$$

By then applying the linear property and the shift theorem, the Fourier transform "G" can be rewritten as:

$$G(v) = H(v) + e^{-i2\pi\left(\frac{v}{f}\right)} * H(v) + e^{-i2\pi\left(\frac{2v}{f}\right)} * H(v) + \cdots + e^{-i2\pi\left(\frac{nv}{f}\right)} * H(v) = H(v) * \left\{\sum_n e^{-i2\pi\left(\frac{nv}{f}\right)}\right\} \qquad \text{EQ (5)}$$

Next, if the number of pulse trains is taken to infinity, the summation simplifies to a delta function as follows:

$$G(v) = H(v) * \delta(v, f) \qquad \text{EQ (6)}$$

where δ(v, ƒ) is known as the delta function. This means v is not equal to f when the value is zero, and when they are equal, the value is infinity. If the number of signals is finite then the delta function takes a shape of an impulse with a width. The amplitude of the pulse is proportionally related to the number of pulses. If the pulse function is written as P(v,f), where v is the frequency and f would be the center of the pulse, then:

$$G(v) = H(v) * N * P(v, f), \qquad \text{EQ (7)}$$

where N is the number of pulses. Accordingly, Equation 7 may represent a mathematical expression to produce a clean signal off a noisy source that has a broadband response.

Figure 1B:
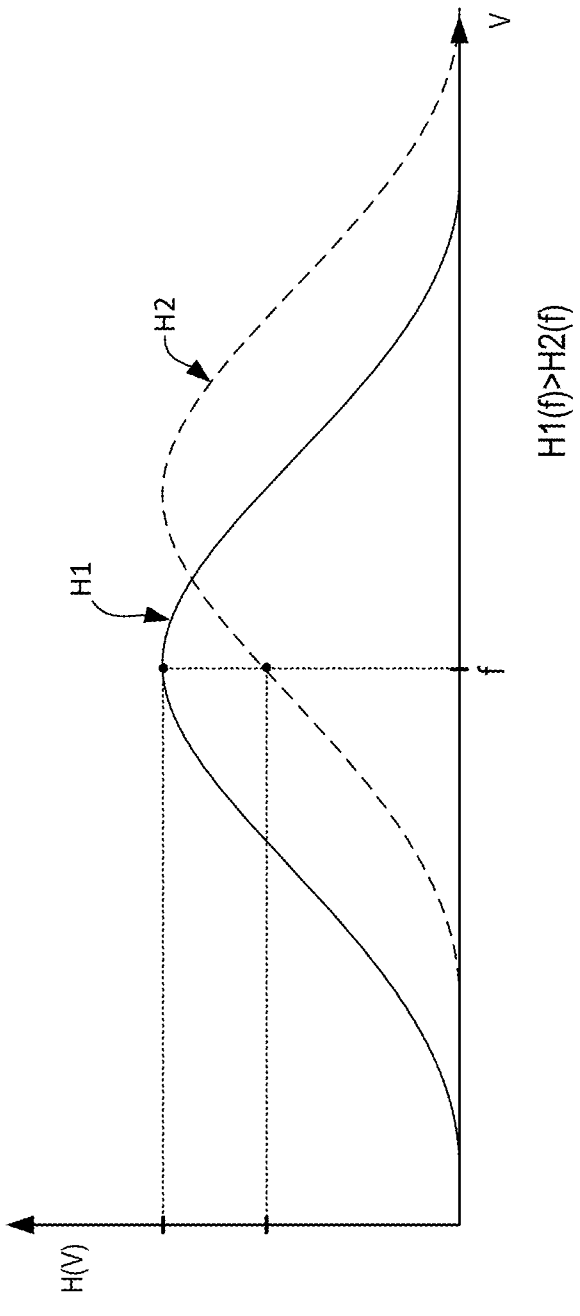
FIG. 1B illustrates example transfer functions for the control of RF emission of an area of plasma, in accordance with aspects of the disclosure.

The expression "G" is now apparent on its relation to the broadband response of an area of plasma, such as the area of plasma 106. FIG. 1B illustrates two different transfer functions H1 and H2. If it is desired to pulse at a frequency "f" it would be beneficial to select the transfer function that would give a higher value. In the example of FIG. 1B, H1 should be chosen over H2 because H1(*f*)>H2(*f*).

By controlling the H transfer function, aspects of the present disclosure can control the emission of the RF from the plasma. For example, assume a target RF emission of 16-20 GHz is desired. While the natural frequency of the plasma may be centered at 5-10 GHz, the plasma still contains a signal at 16-20 GHz, albeit at a significantly low level. Thus, by shifting the plasma's RF natural frequency to 16-20 GHz using the techniques described herein, aspects of the present disclosure can efficiently generate an area of plasma that emits RF at the target frequency.

As another example, assume the wireless transmitter 102 intends to generate an area of plasma 106 having an RF component 108 of 10 GHz. Further assume that the area of plasma has a broadband at 20-40 GHz at 10 dBm and −10 dBm at 10 GHz. Normally, this would require an increase in power of output 104 to 20 dB in order to get an RF component 108 of 10 dBm at 10 GHz. However, wireless transmitter 102 may select a lower output 104 energy by tuning the natural frequency to be optimized at 10 GHz as described herein. In some aspects, multiple sources of high-energy can be combined to generate an area of plasma 106 that produces an RF component 108 that is higher at a target frequency but at a combined lower energy of output 104.

Referring now back to FIG. 1A, the network 114 may include a number of routing agents and processing agents. The network 114 may be a global system of interconnected computers and computer networks that uses an Internet protocol suite (e.g., the Transmission Control Protocol (TCP) and IP) to communicate among disparate devices/networks.

In FIG. 1A, computing device 112 is shown as connected to the network 114 (e.g., over an Ethernet connection or Wi-Fi or 802.11-based network). Although illustrated as a desktop computer, computing device 112 may be a laptop computer, a tablet computer, a PDA, a smart phone, or the like. The computing device 112 may contain functionality to manage wireless transmitter 102, and/or manage or otherwise communicate with one or more of the remote devices 110A-110F. Similarly, wireless transmitter 102 may be connected to the network 114 via, for example, an optical communication system, such as FiOS, a cable modem, a digital subscriber line (DSL) modem, or the like.

Also shown in FIG. 1A is optional server 116, shown as connected to the network 114. Server 116 may be implemented as a plurality of structurally separate servers, or alternately may correspond to a single server. In some aspects, server 116 contains functionality to manage wireless transmitter 102, and/or manage or otherwise communicate with one or more of the remote devices 110A-110F.

Figure 2:
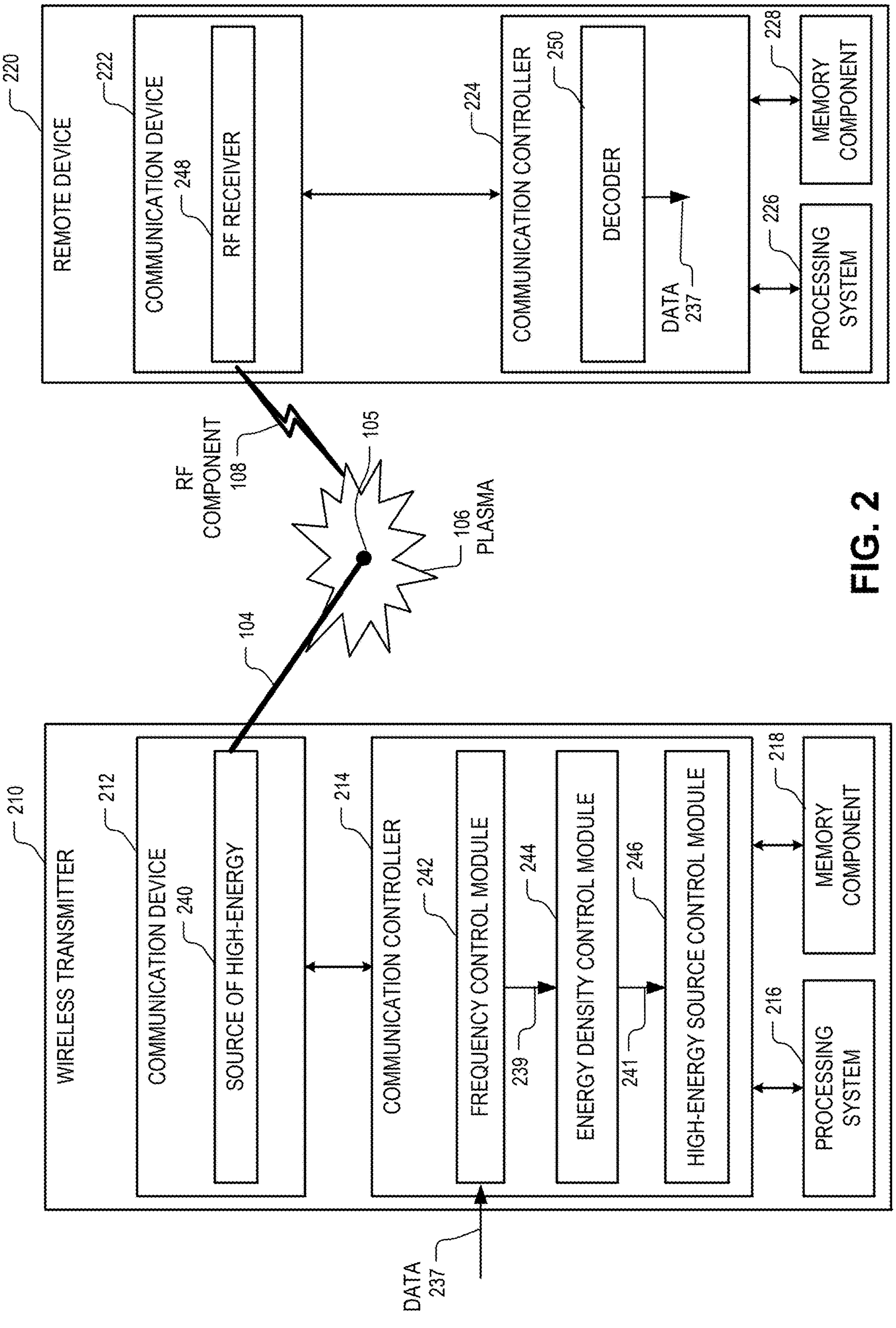
FIG. 2 illustrates an example wireless transmitter and an example remote device, in accordance with aspects of the disclosure.

FIG. 2 illustrates an example wireless transmitter 210 and an example remote device 220, in accordance with aspects of the disclosure. Wireless transmitter 210 is one possible implementation of wireless transmitter 102 of FIG. 1A. Remote device 220 is one possible implementation of any of the remote devices 110A-110F of FIG. 1A. The wireless transmitter 210 of FIG. 2 is shown as including a communication device 212, a communication controller 214, a processing system 216, and a memory component 218. Remote device 220 is shown as including a communication device 222, a communication controller 224, a processing system 226, and a memory component 228.

In the example of FIG. 2, communication device 222 of remote device 220 includes an RF receiver 248. RF receiver 248 is configured to receive radio frequency communications from other devices and may also be configured to receive radio frequency communications via at least one designated radio access technology (RAT). The communication device 212 of wireless transmitter 210 is shown as including a source of high-energy 240. In some examples, the source of high-energy 240 includes one or more lasers, such as one or more Nd:YAG lasers. In some implementations, the Nd:YAG lasers comprise 10 Hz, 6 W and/or 10 Hz, 6.5 W lasers. The source of high-energy 240 may also include one or more mechanical and/or optical components for focusing, modifying, steering, filtering, or otherwise controlling the output 104 of the source of high-energy 240.

The wireless transmitter 210 and remote device 220 may also each generally include a communication controller (represented by the communication controllers 214 and 224) for controlling operation of their respective communication devices 212 and 222 (e.g., directing, modifying, enabling, disabling, etc.). The communication controllers 214 and 224 may operate at the direction of or otherwise in conjunction with respective host system functionality (illustrated as the processing systems 216 and 226 and the memory components 218 and 228). In some designs, the communication controllers 214 and 224 may be partly or wholly subsumed by the respective host system functionality.

Turning to the illustrated transmissions in more detail, the communication controller 214 of wireless transmitter 220 is shown as including a frequency control module 242, an energy density control module 244, and a high-energy source control module 246, which together may operate in conjunction with the source of high-energy 240 to control and manage the creation of the area of plasma 106 as well as the particular RF component 108 that is generated. The frequency control module 242, the energy density control module 244, and the high-energy control module 246 may include routines, program instructions, objects, and/or data structures that perform particular tasks or implement particular abstract data types, as described herein.

Figure 3:
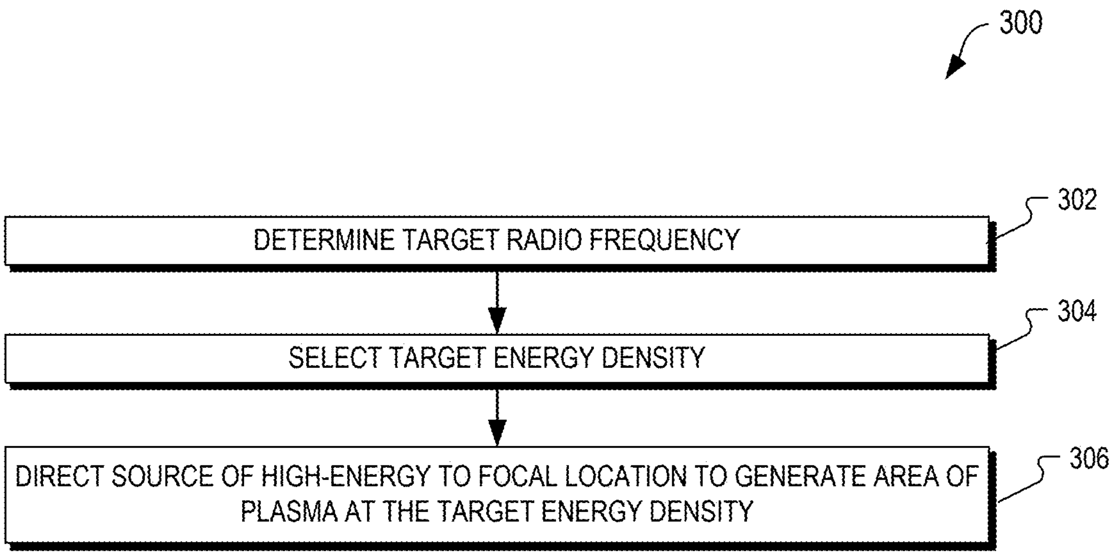
FIG. 3 illustrates an example process of wireless transmission, in accordance with aspects of the disclosure.

FIG. 3 illustrates an example process 300 of wireless transmission, in accordance with aspects of the disclosure. Process 300 is one possible process of wireless transmission performed by wireless transmitter 102 of FIG. 1A or wireless transmitter 210 of FIG. 2. Process 300 will be described with reference to FIGS. 2 and 3.

In a process block 302, the frequency control module 242 determines a target radio frequency 239. In some examples, the target radio frequency 239 is a desired or intended frequency of the RF component 108. The frequency with which to set the target radio frequency 239 may be received via user input (not shown) or may be predetermined (e.g., stored in memory component 218).

Next, in a process block 304, the energy density control module 244 selects a target energy density 241 for the area of plasma 106 that is to be generated at focal location 105, at or near the remote device 220. As mentioned above, the RF component 108 generated by the area of plasma 106 is dependent on the energy density of the area of plasma 106. Thus, the energy density control module 244 selects the target energy density 241 based on the target radio frequency 239, such that the RF component 108 produced by the plasma 106 is at target radio frequency 239 (e.g., the frequency of the RF component is approximately equal to the target radio frequency).

In some examples, the energy density control module 244 references one or more lookup tables included in memory component 218 to determine the target energy density 241. For example, the lookup tables may include a list of target reference frequencies and a corresponding target energy density for generating an RF component at that frequency. In some examples, the energy density control module 244 may further adjust the target energy density 241 based on one or more other dynamically determined factors, such as weather, altitude, the type of the remote device (e.g., surface material), speed (e.g., for possible Doppler considerations), and the like.

Next, in a process block 306, the high-energy source control module 246 directs the source of high-energy 240 to focal location 105 to generate the area of plasma 106 at the target energy density 241. As mentioned above, the source of high-energy 240 may include one or more mechanical and/or optical components for focusing, modifying, steering, filtering, or otherwise controlling the output 104 of the source of high-energy 240. Thus, the high-energy source control module 246 may generate one or more control signals for activating and steering the output 104 to the focal location 105 to generate the area of plasma 106 at the target energy density 241. As shown in FIG. 2, the area of plasma 106 includes (i.e., emits) RF component 108 at the target radio frequency 239. In some examples, the area of plasma 106 generates a spectrum of radio frequency emissions, where the RF component 108 is a dominant frequency of the spectrum. In some examples, the RF component 108 is the frequency component with the largest amplitude compared to other frequency components of the area of plasma 106. In other examples, the RF component 108 is one or more frequency components other than the dominant frequency of the spectrum of RF emissions produced by the area of plasma 106. For instance, the remote device 220 may include a filter that is configured to detect a specific frequency or several specific frequencies, other than the dominant frequency.

Figure 4:
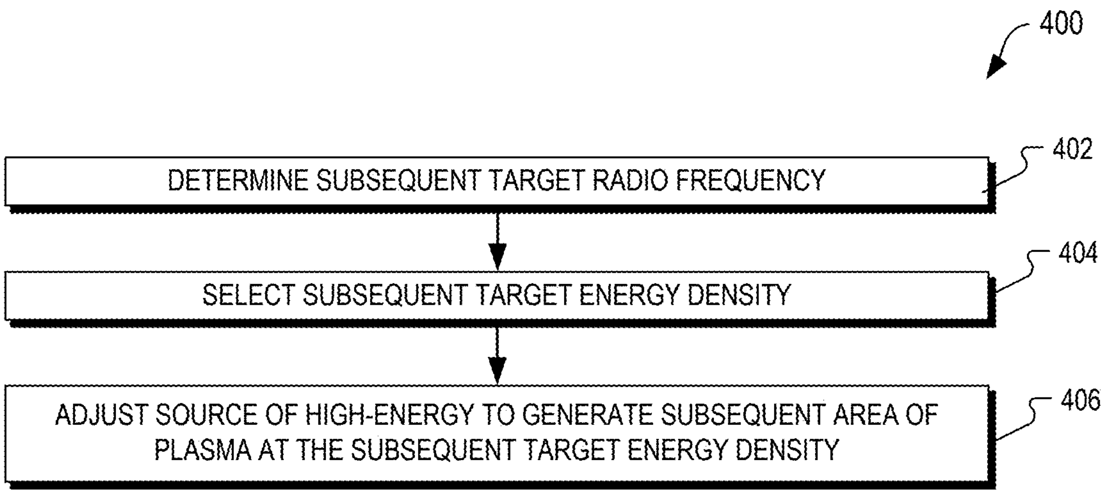
FIG. 4 illustrates an additional example process of wireless transmission, in accordance with aspects of the disclosure.

In some examples, wireless transmitter 210 is configured to dynamically or repeatedly change or shift the RF component 108 emitted by the area of plasma 106. In some aspects, discussed more below, dynamically shifting the RF component 108 allows for one or more FSK schemes to be utilized in the wireless transfer of data 237 from wireless transmitter 210 to remote device 220. Accordingly, FIG. 4 illustrates an additional example process 400 of wireless transmission, in accordance with aspects of the disclosure. Process 400 is one possible process of wireless transmission performed by wireless transmitter 102 of FIG. 1A or wireless transmitter 210 of FIG. 2. Process 400 will be described with reference to FIGS. 2 and 4.

In some examples, process block 402 begins after or during a previous area of plasma 106 has been generated. Thus, in some aspects, process block 402 follows process block 306 of process 300. In a process block 402, the frequency control module 242 determines a subsequent target radio frequency. In some examples, the subsequent target radio frequency is a desired or intended frequency of the RF component 108 and is different than a current or previous RF component 108 generated by the area of plasma 106.

Next, in a process block 404, the energy density control module 244 selects a subsequent target energy density for the area of plasma 106 that is to be generated at focal location 105, at or near the remote device 220. The energy density control module 244 selects the subsequent target energy density based on the subsequent target radio frequency, such that the RF component 108 produced by the plasma 106 is at subsequent target radio frequency 239. Since the subsequent target radio frequency is different than the current or previous RF component 108, then the subsequent target energy density will also be different than a current or previous target energy density.

Next, in a process block 406, the high-energy source control module 246 directs the source of high-energy 240 to focal location 105 to generate a subsequent area of plasma 106 at the subsequent target energy density. The high-energy source control module 246 may generate one or more control signals for activating and steering the output 104 to the focal location 105 to generate the subsequent area of plasma 106 at the subsequent target energy density 241 to generate a subsequent RF component 108 at the subsequent target energy. In some aspects, the subsequent RF component at the subsequent target radio frequency is a dominant frequency of radio frequency emissions produced by the subsequently generated area of plasma 106.

Thus, in some aspects, the communication controller 214 of wireless transmitter 210 is configured to adjust the energy density of the area of plasma 106 in order to control the RF component 108 produced. The energy density of the area of plasma 106 can be adjusted in a variety of ways. FIGS. 5A-9B illustrate several example methods that may be implemented by wireless transmitter 210 for adjusting the energy density.

In some examples, the energy density of an area of plasma may be adjusted by adjusting the focal location of the area of plasma. For instance, in some aspects, adjusting the focal location of a single laser beam could change the energy density if the focal location were in front of or behind the remote device. This would make the area of plasma larger and would lower the energy density. Another case would be if the focal locations of two or more lasers were changed so that they didn't overlap, which would also cause a change in the energy density due to a lack of a linear relationship between the amount of laser energy put on the receiver and how much RF emission is produced by the area of plasma (e.g., 2× laser energy might result in more than 2× RF emission by the area of plasma).

Figure 5A:
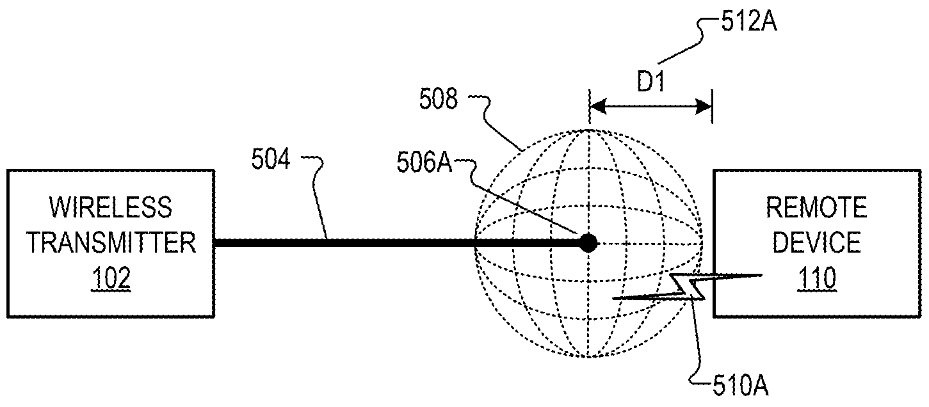
FIGS. 5A and 5B illustrate an example of adjusting a focal location of an area of plasma, in accordance with aspects of the disclosure.
Figure 5B:
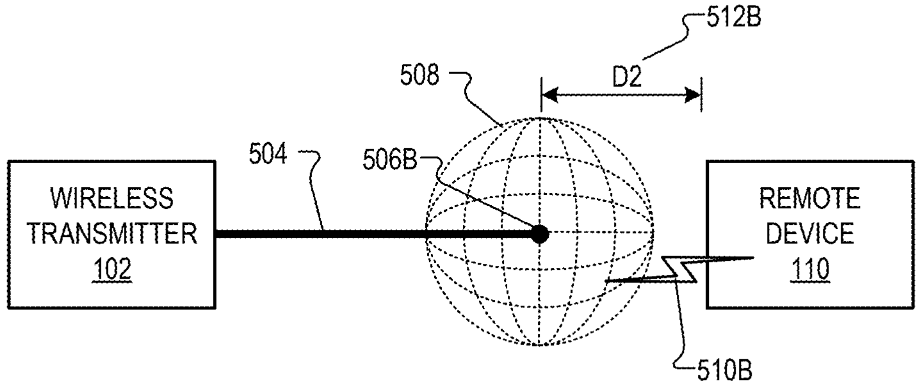

FIGS. 5A and 5B illustrate an example of adjusting a focal location of an area of plasma, in accordance with aspects of the disclosure. In particular, FIG. 5A illustrates wireless transmitter 102 directing an output 504 of a source of high-energy to a first focal location 506A. As shown, first focal location 506A is a first distance D1 512A from the remote device 110. In some examples, first distance D1 512A is measured from a surface (e.g., closest facing surface of remote device 110 to plasma 508) to the first focal location 506A. As further shown, an area of plasma 508 is induced at the first focal location 506A that includes a first RF component 510A.

FIG. 5B illustrates an adjustment to the focal location, such that the area of plasma 508 is now induced at a second focal location 506B that is a second distance D2 512B from the remote device 110. Although the second distance D2 512B is shown as being greater than the first distance D1 512A, in other examples, second distance D2 512B may be smaller than the first distance D1 512A such that the second focal location 506B is closer to the remote device 110. At the second focal location 506B, the area of plasma 508 generates a second RF component 510B that is different from the first RF component 510A.

In some examples, adjusting the focal location of output 504 may include generating one or more control signals (e.g., by high-energy source control module 246 of FIG. 2) to control one or more mechanical and/or optical components for focusing, modifying, steering, filtering, or otherwise controlling the output 104 to adjust the focal location.

Figure 6A:
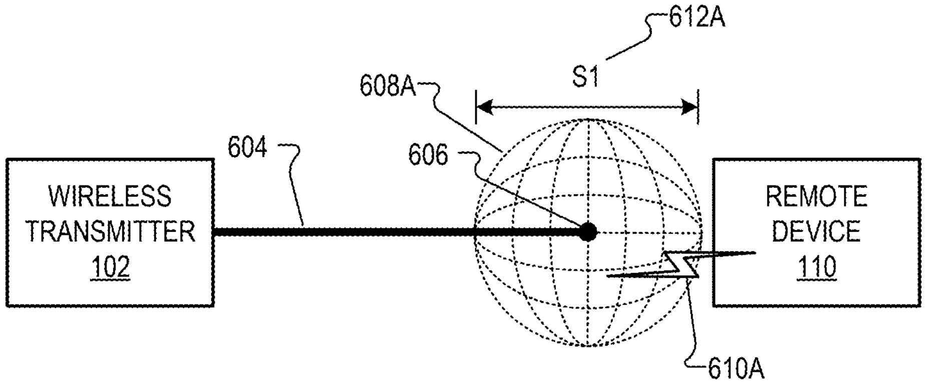
FIGS. 6A and 6B illustrate an example of adjusting a size of an area of plasma, in accordance with aspects of the disclosure.
Figure 6B:
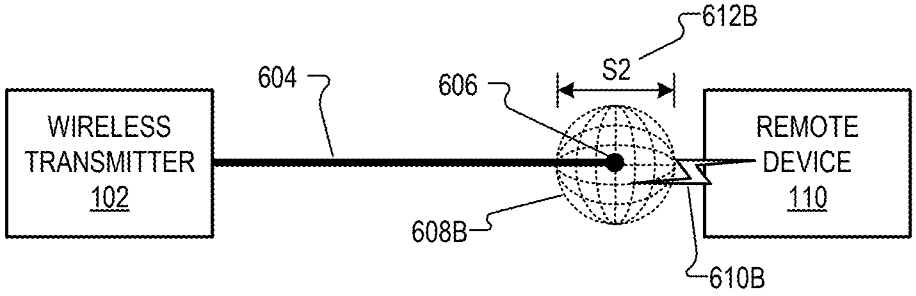

In some aspects, the energy density of an area of plasma is changed by adjusting a size of the area of plasma. For instance, FIGS. 6A and 6B illustrate an example of adjusting the size of an area of plasma, in accordance with aspects of the disclosure. In particular, FIG. 6A illustrates wireless transmitter 102 directing an output 604 of a source of high-energy to a focal location 606 to induce a first area of plasma 608A. As shown, first area of plasma 608A has a first size S1 612A. In some examples, the first area of plasma 608A is a plasma ball having a spherical shape, where first size S1 612A is a diameter of the spherical shape. As further shown, the first area of plasma 608A emits a first RF component 610A.

FIG. 6B illustrates an adjustment to the size, such that a second area of plasma 608B now has a second size S2 612B. Although the second size S2 612B is shown as being smaller than the first size S1 612A, in other examples, second size S2 612B is larger than the first size S1 612A. At the second size S2 612B, the second area of plasma 608B generates a second RF component 610B that is different from the first RF component 610A.

In some examples, adjusting the size of an area of plasma may include generating one or more control signals (e.g., by high-energy source control module 246 of FIG. 2) to control one or more mechanical and/or optical components for focusing, modifying, steering, filtering, or otherwise controlling the output 104 to adjust the size.

Figure 7A:
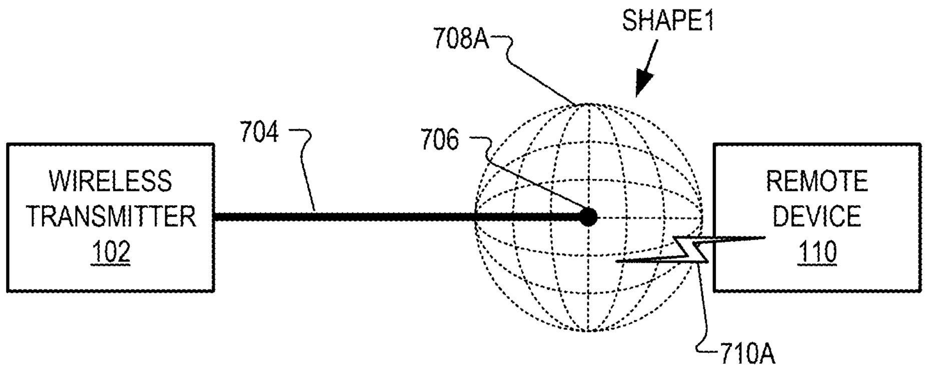
FIGS. 7A and 7B illustrate an example of adjusting a shape of an area of plasma, in accordance with aspects of the disclosure.
Figure 7B:
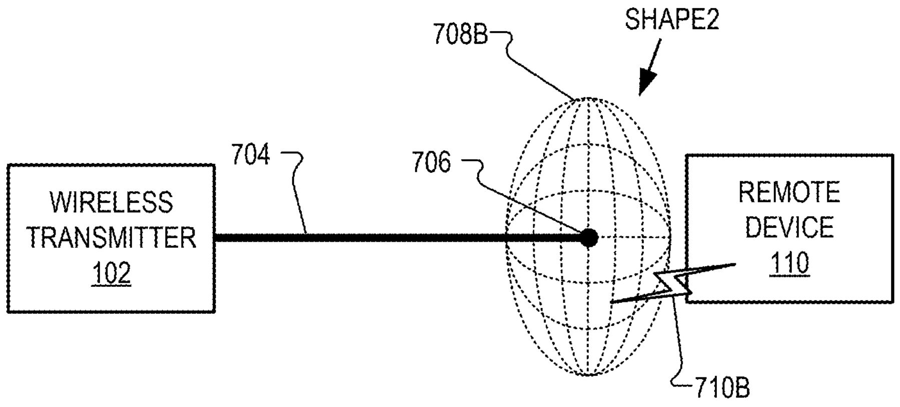

In some aspects, the energy density of an area of plasma is changed by adjusting a shape of the area of plasma. For instance, FIGS. 7A and 7B illustrate an example of adjusting the shape of an area of plasma, in accordance with aspects of the disclosure. In particular, FIG. 7A illustrates wireless transmitter 102 directing an output 704 of a source of high-energy to a focal location 706 to induce a first area of plasma 708A. As shown, first area of plasma 708A has a first shape, SHAPE1. In some examples, the first shape SHAPE1 is a spherical shape. However, the first shape SHAPE1 may be any regular or irregular 3D shape. As further shown, the first area of plasma 708A when in the first shape SHAPE1 emits a first RF component 710A.

FIG. 7B illustrates an adjustment to the shape, such that a second area of plasma 708B now has a second shape SHAPE2 that is different from the first shape SHAPE1. Although the second shape SHAPE2 is shown as being an elongated spheroid, in other examples, the second shape SHAPE2 may be any regular or irregular 3D shape that is different from the first shape SHAPE1. At the second shape SHAPE2, the second area of plasma 708B generates a second RF component 710B that is different from the first RF component 710A.

In some examples, adjusting the shape of an area of plasma includes generating one or more control signals (e.g., by high-energy source control module 246 of FIG. 2) to control one or more mechanical and/or optical components for focusing, modifying, steering, filtering, or otherwise controlling the output 104 to adjust the shape.

Figure 8A:
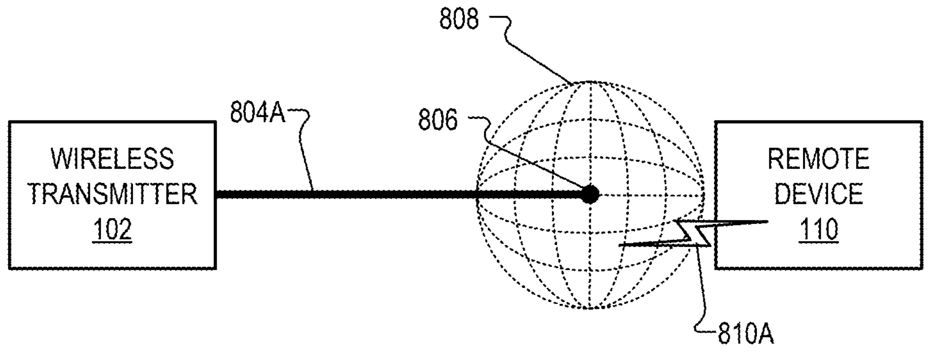
FIGS. 8A and 8B illustrate an example of adjusting a number of lasers to induce an area of plasma, in accordance with aspects of the disclosure.
Figure 8B:
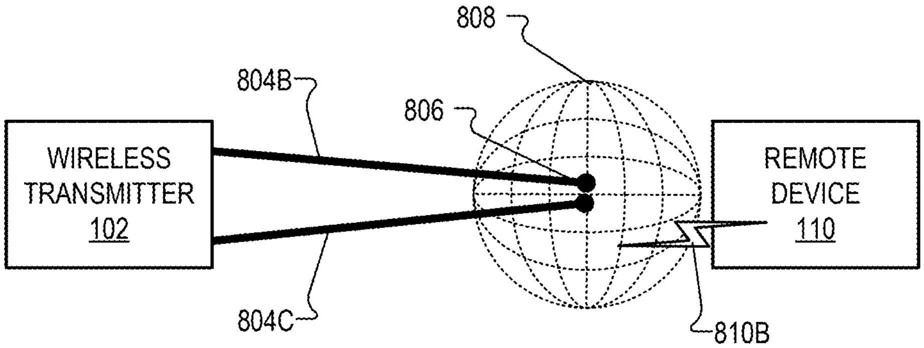

In yet another example, the high-energy source (e.g., source of high-energy 240 of FIG. 2) used to induce the plasma may include one or more lasers, where adjusting the energy density of the plasma includes adjusting the number of lasers utilized to generate the plasma. For instance, FIGS. 8A and 8B illustrate an example of adjusting the number of lasers utilized to induce an area of plasma, in accordance with aspects of the disclosure. In particular, FIG. 8A illustrates wireless transmitter 102 directing single laser 804A to a focal location 806 to induce an area of plasma 808 having a first energy density. As further shown, the area of plasma 808 emits a first RF component 810A when a single laser 804A is utilized.

FIG. 8B illustrates an adjustment to the energy density by activating additional lasers 804B and 804C that are both directed to the focal location 806, such that the area of plasma 808 now has a second energy density that is different from the first energy density of FIG. 8A. Although FIG. 8B illustrates increasing the number of lasers from one to two, in other examples a change in the number of lasers may include any increase or decrease in the number of lasers utilized to induce the area of plasma 808. With both lasers 804B and 804C, the area of plasma 808 now generates a second RF component 810B that is different from the first RF component 810A.

In some examples, adjusting the number of lasers used to induce an area of plasma includes generating one or more control signals (e.g., by high-energy source control module 246 of FIG. 2) to activate or deactivate particular lasers and/or to control one or more mechanical and/or optical components for focusing, modifying, steering, filtering, or otherwise controlling the source of high-energy included in the wireless transmitter 102.

Figure 9A:
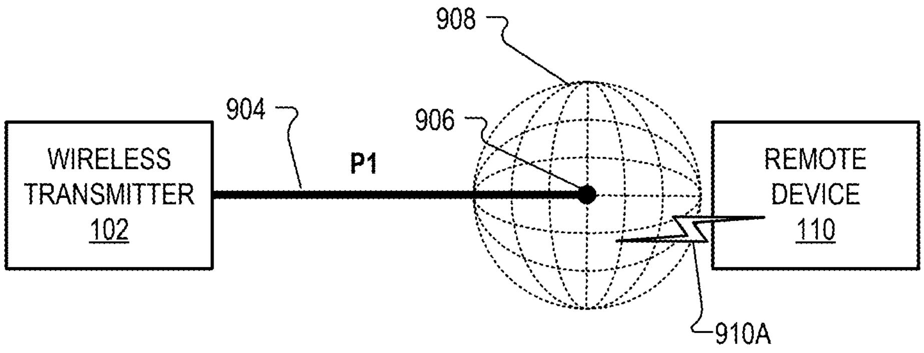
FIGS. 9A and 9B illustrate an example of adjusting a power level of a source of high-energy used to generate an area of plasma, in accordance with aspects of the disclosure.
Figure 9B:
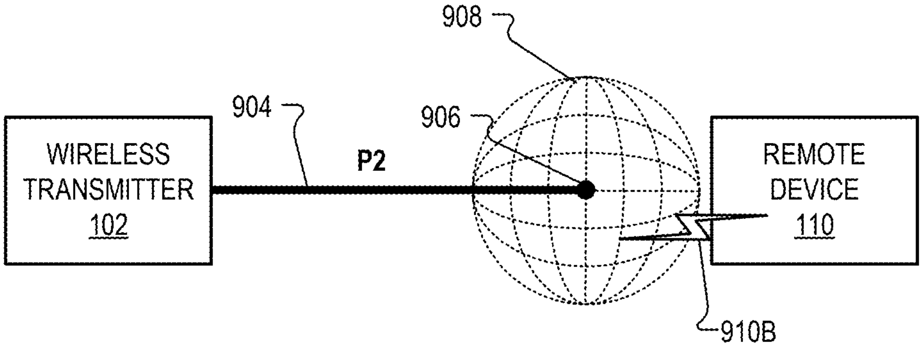

In yet another example, adjusting the energy density of the plasma includes adjusting the power level of the source of high-energy utilized to generate the plasma. For instance, FIGS. 9A and 9B illustrate an example of adjusting a power level of a source of high-energy used to generate an area of plasma, in accordance with aspects of the disclosure. In particular, FIG. 9A illustrates wireless transmitter 102 directing a first output 904A to a focal location 906 to induce an area of plasma 906 having a first energy density. As shown in FIG. 9A, the output 904 has a first power level P1. As further shown, the area of plasma 908 emits a first RF component 910A when the output 904 is at the first power level P1.

FIG. 9B illustrates an adjustment to the energy density by adjusting the power level of the output 904, such that the output 904 is now at a second power level P2. In some examples, the second power level P2 is greater that the first power level P1. However, in other examples, the second power level P2 is less than the first power level P1. At the second power level P1, the area of plasma 908 now generates a second RF component 910B that is different from the first RF component 910A.

In some examples, adjusting the power level of the source of high-energy that is used to induce an area of plasma includes generating one or more control signals (e.g., by high-energy source control module 246 of FIG. 2) to set an output level of one or more particular lasers, and/or to control one or more mechanical and/or optical components for focusing, modifying, steering, filtering, or otherwise controlling the source of high-energy included in the wireless transmitter 102.

Figure 10:
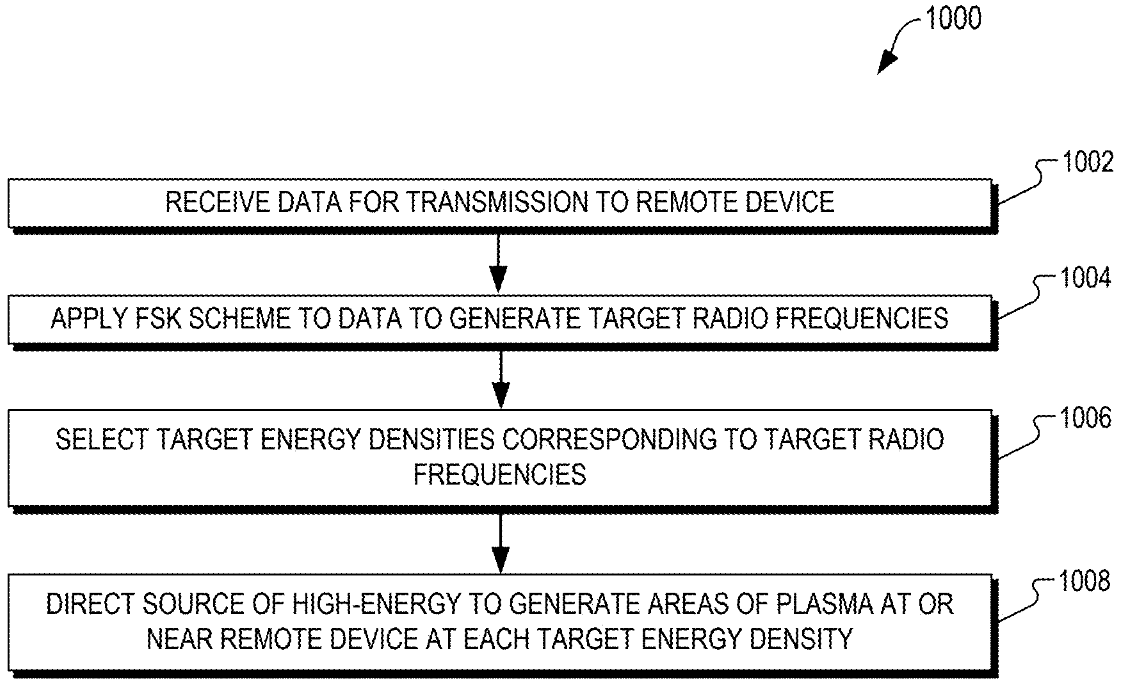
FIG. 10 illustrates a process of wirelessly transmitting data, in accordance with aspects of the disclosure.

FIG. 10 illustrates a process 1000 of wirelessly transmitting data, in accordance with aspects of the disclosure. Process 1000 is one possible process performed by wireless transmitter 102 of FIG. 1 and/or wireless transmitter 210 of FIG. 2. Process 1000 will be described with reference to FIGS. 2 and 10.

In a process block 1002, the frequency control module 242 receives data 237 for transmission to remote device 220. The data 237 may be received at the wireless transmitter 210 via a communications interface (not shown), may be stored in memory component 218, may be dynamically created, or may be input by a user.

Next, in a process block 1004, the frequency control module 242 applies a frequency shift-keying (FSK) scheme to the data 237 to generate a plurality of target radio frequencies. By way of example, the data 237 may be binary data and the FSK scheme may be a binary FSK or 2-FSK scheme where the target radio frequency is shifted between two discrete frequencies to communicate binary (0 and 1) information. In another example, data 237 may be binary, hexadecimal, or other format where the FSK scheme is a multiple FSK scheme that shifts the target radio frequency between more than two discrete frequencies.

In a process block 1006, the energy density control module 244 selects a plurality of target energy densities corresponding to the plurality of target radio frequencies. In some aspects, the plurality of target energy densities comprises a sequential list of energy densities for an area of plasma to generate a series of RF components that correspond to the plurality of target radio frequencies. By way of example, assume a 2-FSK scheme is applied to data 237 that includes a binary stream of [0,1,0,1]. Applying the 2-FSK scheme to this binary stream generates an ordered series of target radio frequencies of [FREQUENCY_1, FREQUENCY_2, FREQUENCY_1, FREQUENCY_2]. Thus, the sequential list of target energy densities selected may include [ENERGY_DEN_1, ENERGY_DEN_2, ENERGY_DEN_1, ENERGY_DEN_2], where ENERGY_DEN_1 corresponds to an energy density for an area of plasma that generates an RF component at FREQUENCY_1 and ENERGY_DEN_2 corresponds to an energy density that generates an RF component at FREQUENCY_2.

Next, in process block 1008, the high-energy source control module 246 directs the source of high-energy 240 to generate areas of plasma at or near the remote device 220 at each of the target energy densities. Generating the areas of plasma may include sequentially generating areas of plasma according to the sequential list of target energy densities, such that each respective RF component generated corresponds to a respective one of the target radio frequencies. The wireless transmitter 210 may dynamically adjust the energy densities of the induced area of plasma to sequentially generate RF components at the target frequencies according to any of the methods discussed herein, including the methods shown in FIGS. 5A-9B. In some examples, each sequentially generated RF component is a dominant frequency of its respective area of induced plasma.

Figure 11:
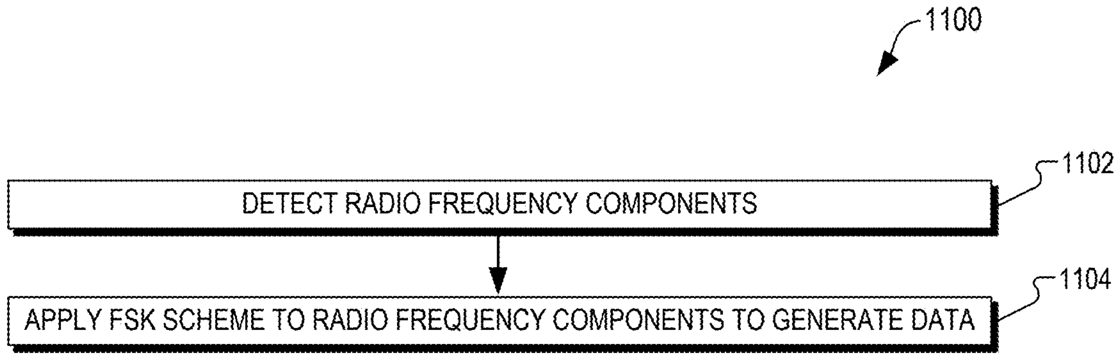
FIG. 11 illustrates a process of wirelessly receiving data, in accordance with aspects of the disclosure.

FIG. 11 illustrates a process 1100 of wirelessly receiving data, in accordance with aspects of the disclosure. Process 1100 is one possible process performed by any of the remote devices 110A-110F of FIG. 1 and/or remote device 220 of FIG. 2. Process 1100 will be described with reference to FIGS. 2 and 11.

In a process block 1102, the RF receiver 248 of communication device 222 detects one or more RF components 108. In some examples, detecting the one or more RF components 108 includes sequentially detecting a dominant frequency for each sequential area of plasma 106 that is induced at or near the remote device 220. Thus, in some examples, RF receiver 248 may include one or more filters, analyzers, or other RF components for determining the dominant frequency of RF emissions from the area of plasma 106. In some aspects, detecting the dominant frequency includes selecting the frequency component with the largest amplitude compared to other frequency components emitted by the area of plasma 106.

Next, in a process block 1104, a decoder 250 of the remote device 220 applies an FSK scheme to the sequential list of detected RF components to generate data 237. Continuing with the example provided above, assuming the sequential list of detected RF components includes detected frequencies of [FREQUENCY_1, FREQUENCY_2, FREQUENCY_1, FREQUENCY_2], then applying the 2-FSK scheme to these frequencies generates a binary stream of [0,1,0,1].

Figure 12:
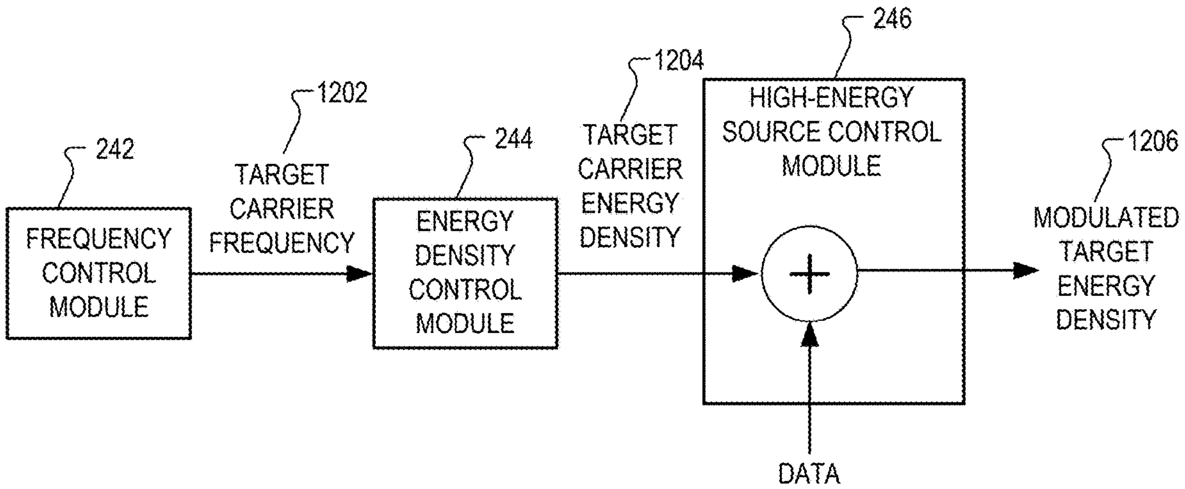
FIGS. 12 and 13 illustrate a process of modulating a target carrier energy density to wirelessly communicate data, in accordance with aspects of the disclosure.
Figure 13:
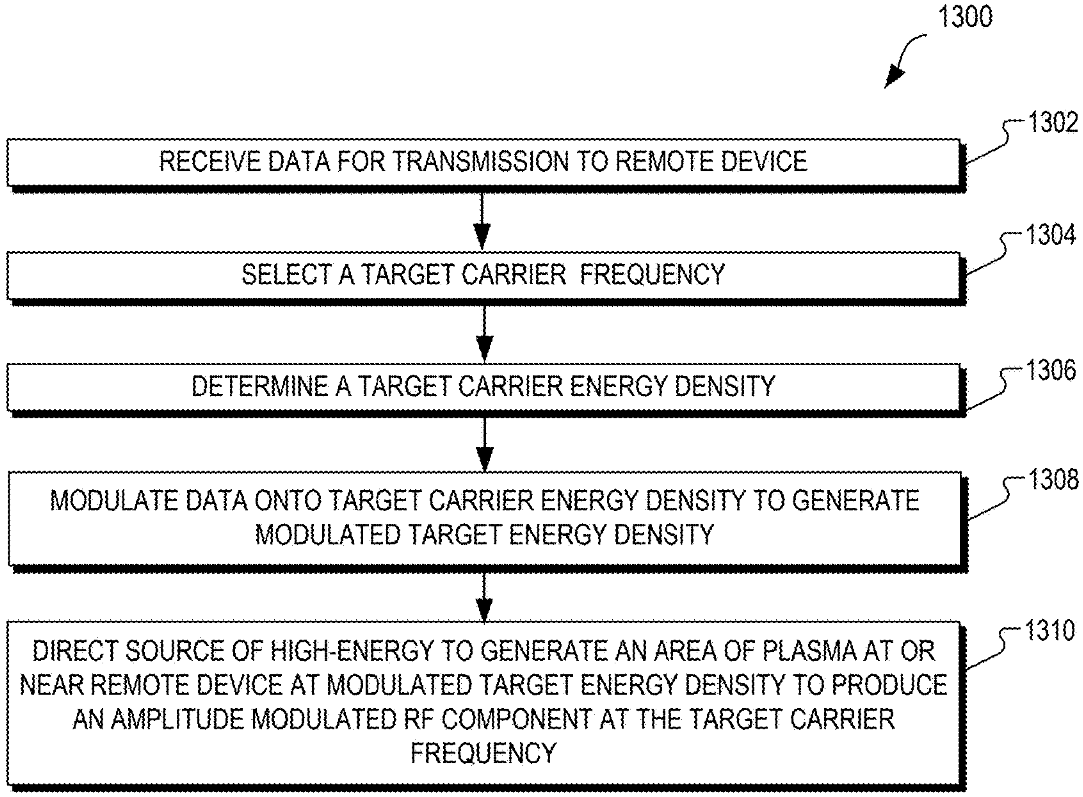

FIG. 12 illustrates an example modulation scheme that may be performed by one or more modules of wireless transmitter 210, in accordance with aspects of the present disclosure. FIG. 13 illustrates a process of modulating a target carrier energy density to wirelessly communicate data, in accordance with aspects of the disclosure. Process 1300 will be described with reference to FIGS. 12 and 13.

In a process block 1302, the wireless transmitter (e.g., wireless transmitter 210 of FIG. 2) receives data that is to be transmitted to a remote device (e.g., remote device 220 of FIG. 2). Next, in a process block 1304, the frequency control module 242 selects a target carrier frequency 1202. In some examples, the target carrier frequency 1202 is predetermined. In other examples, target carrier frequency 1202 may be dynamically determined based on one or more environmental conditions. In process block 1306, the energy density control module 244 determines a target carrier energy density 1204 based on the target carrier frequency 1202. The determination of the target carrier density 1204 may be selected such that an induced area of plasma at or near the remote device has a dominant RF component at the target carrier frequency 1202. Next, in a process block 1308, the high-energy source control module 246 modulates the data onto the target carrier energy density to generate a modulated target energy density 1206. In some examples, modulating the data onto the target carrier energy density 1204 includes adjusting the energy density of the area of plasma to control amplitude variations in the dominant RF component produced by the area of plasma. Then in process block 1310, the high-energy source control module 246 directs the source of high-energy to generate the area of plasma at or near the remote device at the modulated target energy density. Thus, the area of plasma generated may include an amplitude modulated RF component at the target carrier frequency 1202. In some implementations, the remote device, such as remote device 220 of FIG. 2 may include a demodulator that is configured to demodulate the dominant RF component generated by the area of plasma.

The processes, methods, functions, or modules explained above may be implemented in hardware, software, firmware, or any combination thereof. If implemented in software, the techniques may be stored on or transmitted as one or more instructions or code on a computer-readable medium. The techniques described may constitute computer-executable instructions embodied or stored within a tangible or non-transitory computer-readable medium, that when executed by a processor will cause the processor to perform the operations or acts described. Additionally, the processes and modules may be embodied within hardware, such as an application specific integrated circuit ("ASIC") or otherwise.

A tangible non-transitory computer-readable medium includes any mechanism that provides (i.e., stores) information in a form accessible by a machine (e.g., a computer, network device, personal digital assistant, manufacturing tool, any device with a set of one or more processors, etc.). For example, a machine-readable medium may include recordable or non-recordable media (e.g., read only memory (ROM), random access memory (RAM), magnetic disk storage media, optical storage media, flash memory devices, etc.).

In addition, the methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A wireless transmission method, comprising:

determining a target radio frequency;

selecting a target energy density for an area of plasma to be generated at or near a remote device, wherein selecting the target energy density includes selecting the target energy density to tune a natural resonant frequency of the area of plasma to be approximately equal to the target radio frequency, and wherein selecting the target energy density further includes selecting a corresponding transfer function of a broadband response of the area of plasma that has an increased value at the target radio frequency; and directing a source of high-energy to a focal location to generate the area of plasma at or near the remote device at the target energy density, wherein a dominant frequency of emissions produced by the area of plasma is the natural resonant frequency and is approximately equal to the target radio frequency.

2. The wireless transmission method of claim 1, further comprising:

determining a subsequent target radio frequency;

selecting a subsequent target energy density for a subsequent area of plasma to tune the natural resonant frequency of the subsequent area of plasma to be approximately equal to the subsequent target radio frequency; and adjusting the source of high-energy to generate the subsequent area of plasma at or near the remote device at the subsequent target energy density, wherein a dominant frequency of emissions produced by the subsequent area of plasma is the natural resonant frequency and is approximately equal to the subsequent target radio frequency.

3. The wireless transmission method of claim 2, wherein adjusting the source of high-energy to generate the subsequent area of plasma at or near the remote device at the subsequent energy density includes adjusting the focal location relative to the remote device.

4. The wireless transmission method of claim 2, wherein adjusting the source of high-energy to generate the subsequent area of plasma at or near the remote device at the subsequent energy density includes adjusting a size of the subsequent area of plasma.

5. The wireless transmission method of claim 2, wherein adjusting the source of high-energy to generate the subsequent area of plasma at or near the remote device at the subsequent energy density includes adjusting a power level of the source of high-energy.

6. The wireless transmission method of claim 2, wherein adjusting the source of high-energy to generate the subsequent area of plasma at or near the remote device at the subsequent energy density includes adjusting a shape of the subsequent area of plasma.

7. The wireless transmission method of claim 1, wherein directing the source of high-energy to the focal location comprises directing one or more lasers to the focal location to generate the area of plasma.

8. The wireless transmission method of claim 1, further comprising:

receiving data for transmission to the remote device;

applying a frequency shift-keying (FSK) scheme to the data to generate a plurality of target radio frequencies;

selecting a plurality of target energy densities corresponding to the plurality of target radio frequencies; and directing the source of high-energy to generate areas of plasma at or near the remote device at each of the plurality of target energy densities, wherein each area of plasma includes a respective radio frequency component corresponding to a respective one of the plurality of target radio frequencies.

9. The wireless transmission method of claim 8, wherein each respective radio frequency component is a dominant frequency of radio frequency emissions produced by a respective area of plasma.

10. The wireless transmission method of claim 1, further comprising:

receiving data for transmission to the remote device;

selecting a target carrier frequency;

determining a target carrier energy density based on the target carrier frequency;

modulating the data onto the target carrier energy density to generate a modulated target energy density; and directing the source of high-energy to generate an area of plasma at or near the remote device at the modulated target energy density, wherein the area of plasma includes an amplitude modulated radio frequency component at the target carrier frequency.

11. The wireless transmission method of claim 10, wherein modulating the data onto the target carrier energy density includes adjusting the source of high-energy by: (i) adjusting the focal location relative to the remote device, (ii) adjusting a size of the subsequent area plasma, (iii) adjusting a power level of the source of high-energy, (iv) adjusting a shape of the subsequent area of plasma, or (v) any combination of (i)-(iv).

12. The wireless transmission method of claim 1, wherein selecting the target energy density comprises referencing a lookup table that maps a plurality of target radio frequencies to a corresponding plurality of target energy densities.

13. The wireless transmission method of claim 1, wherein selecting the target energy density includes tuning the natural resonant frequency of the area of plasma to be optimized at the target radio frequency.

14. A wireless transmitter, comprising:

a source of high-energy;

a frequency control module configured to determine a target radio frequency;

an energy density control module configured to select a target energy density for an area of plasma to be generated at or near a remote device, wherein the energy density control module is further configured to select the target energy density to tune a natural resonant frequency of the area of plasma to be approximately equal to the target radio frequency, and wherein selecting the target energy density includes selecting a corresponding transfer function of a broadband response of the area of plasma that has an increased value at the target radio frequency; and a high-energy source control module configured to direct the source of high-energy to a focal location to generate the area of plasma at or near the remote device at the target energy density, wherein a dominant frequency of emissions produced by the area of plasma is the natural resonant frequency and is approximately equal to the target radio frequency.

15. The wireless transmitter of claim 14, wherein the high-energy source control module is further configured to adjust the source of high-energy to generate a subsequent area of plasma at or near the remote device at a subsequent energy density to tune the natural resonant frequency to be approximately equal to a subsequent target radio frequency, wherein a dominant frequency of radio frequency emissions produced by the subsequent area of plasma is the natural resonant frequency of the subsequent area of plasma and is approximately equal to the subsequent target radio frequency.

16. The wireless transmitter of claim 15, wherein the high-energy source control module is further configured to adjust the source of high-energy to generate the subsequent area of plasma at or near the remote device at the subsequent energy density by: (i) adjusting the focal location relative to the remote device, (ii) adjusting a size of the subsequent area plasma, (iii) adjusting a power level of the source of high-energy, (iv) adjusting a shape of the subsequent area of plasma, or (v) any combination of (i)-(iv).

17. The wireless transmitter of claim 14, wherein the source of high energy comprises one or more lasers, and wherein the high-energy source control module is configured to direct the one or more lasers to the focal location to generate the area of plasma.

18. The wireless transmitter of claim 14, wherein:

the frequency control module is further configured to receive data for transmission to the remote device; and the high-energy source control module is further configured to adjust the target energy density of the area of plasma to communicate the data to the remote device.

19. A wireless communication system, comprising:

a wireless transmitter; and a remote device, wherein the wireless transmitter is configured to wirelessly transmit data to the remote device, and wherein:

the wireless transmitter includes:

a source of high-energy that includes one or more lasers;

a frequency control module configured to determine a target radio frequency;

an energy density control module configured to select a target energy density to tune a natural resonant frequency of an area of plasma to be approximately equal to the target radio frequency, and wherein selecting the target energy density includes selecting a corresponding transfer function of a broadband response of the area of plasma that has an increased value at the target radio frequency; and a high-energy source control module configured to direct the source of high-energy to generate the area of plasma at or near the remote device at the target energy density, wherein a dominant frequency of emissions produced by the area of plasma is the natural resonant frequency and is approximately equal to the target radio frequency; and the remote device includes:

a radio frequency receiver configured to receive and detect the dominant frequency emitted by the area of plasma.

* * * * *